United States Patent [19]

Osborn

[11] Patent Number: 4,776,429

[45] Date of Patent: Oct. 11, 1988

[54] LOADING AND INSPECTION PLATFORM

[76] Inventor: Vernon E. Osborn, 5719 Cunningham St., Houston, Tex. 77041

[21] Appl. No.: 56,150

[22] Filed: Jun. 1, 1987

[51] Int. Cl.$^4$ .............................................. E04G 1/20
[52] U.S. Cl. ..................................... 182/144; 182/147
[58] Field of Search ................. 182/63, 141, 142, 143, 182/144, 145, 146

[56] References Cited

U.S. PATENT DOCUMENTS

| | | | |
|---|---|---|---|
| 853,161 | 5/1907 | Clarke | 182/143 |
| 1,393,932 | 10/1921 | Andre | 182/144 |
| 2,698,673 | 1/1955 | Solomon | 182/63 |
| 3,565,212 | 2/1971 | Johnson | 182/179 |
| 3,566,991 | 3/1971 | Prouix | 182/141 |
| 3,576,233 | 4/1971 | Thatcher | 182/145 |
| 3,891,055 | 6/1975 | Medlock | 182/141 |
| 4,171,033 | 10/1979 | Rust | 182/145 |

Primary Examiner—Reinaldo P. Machado
Attorney, Agent, or Firm—J. Peppers

[57] ABSTRACT

An access structure such as a petroleum products loading platform which includes a vertically moving work platform having guides restrained with a plurality of vertical support members to vertically guide the platform along the support members. A plurality of lifting elements are respectively connected to each of the support members and to the platform to vertically move the platform along each of the support members. A common actuatable power arrangement is connected to each of the lifting elements to cause the lifting elements to vertically move the platform a prescribed distance along each of the support members responsive to each actuation of the power arrangement. Each of the lifting elements may be a hoisting drum and cable arrangement which is vertically moveable responsive to rotation of the hoisting drum to reel in or pay out the cable. The actuatable power arrangement may include a mechanical drive connected to each of the lifting elements to be rotated responsive to each actuation of the power unit. Alternately, the lifting elements may be hydraulic cylinders with the actuatable power means being an electrically driven hydraulic pump system to extend or retract each hydraulic cylinder.

16 Claims, 5 Drawing Sheets

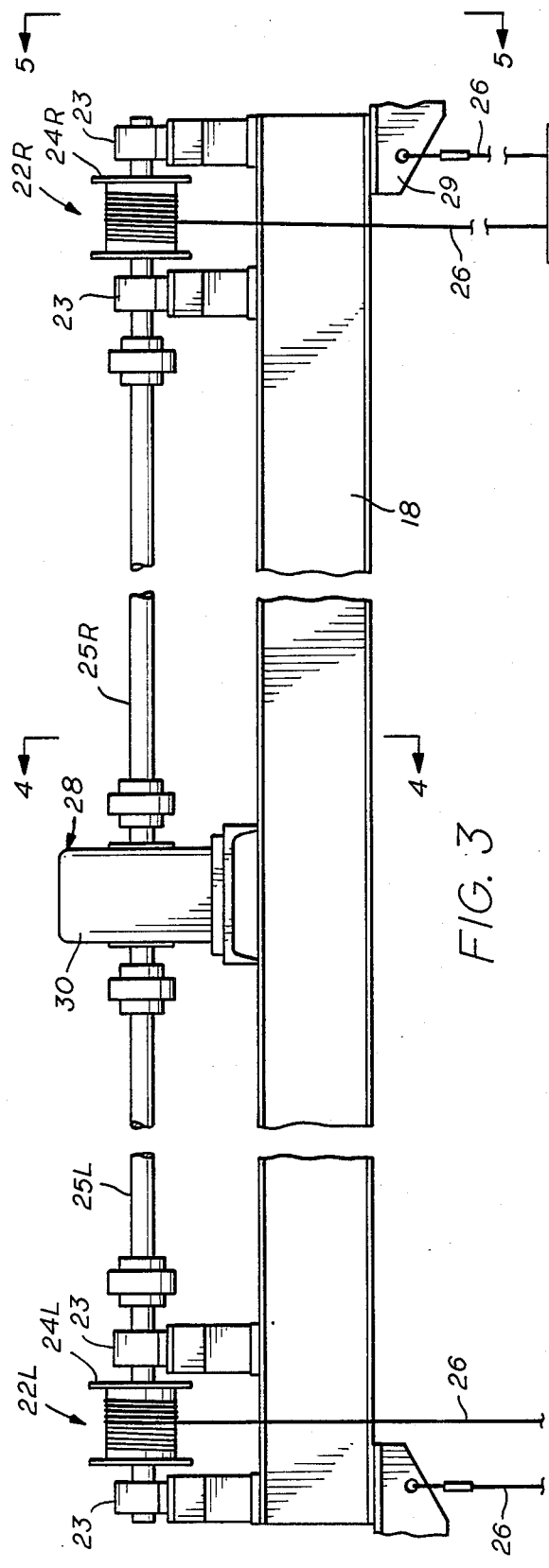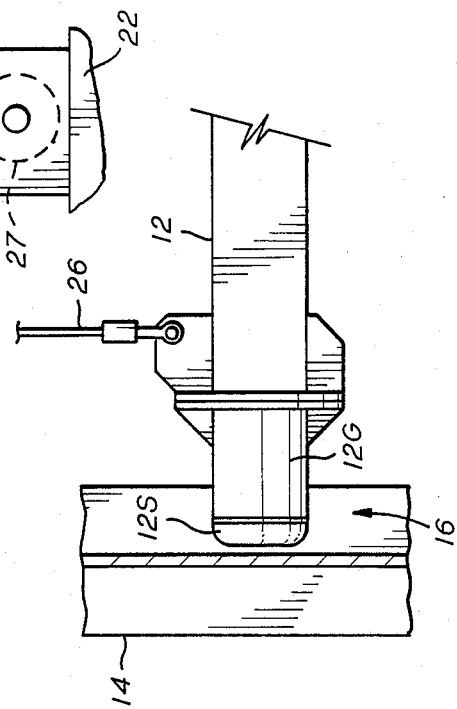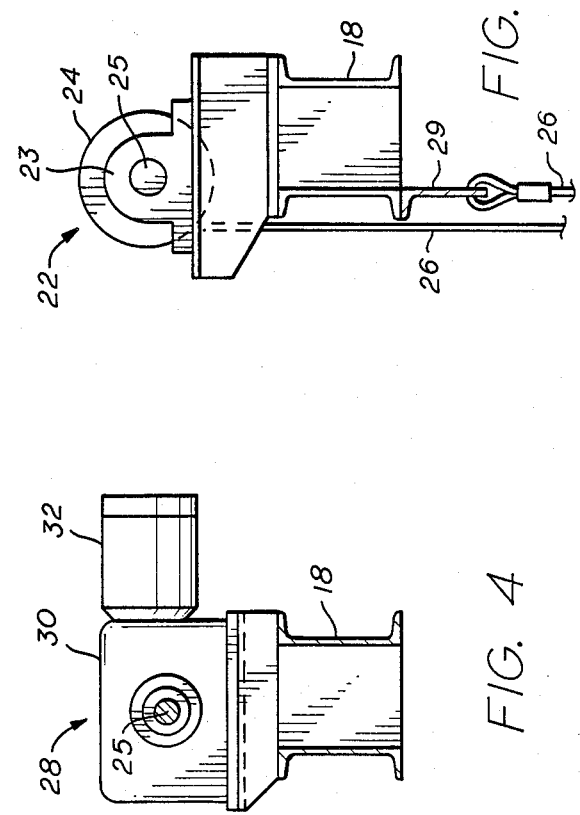

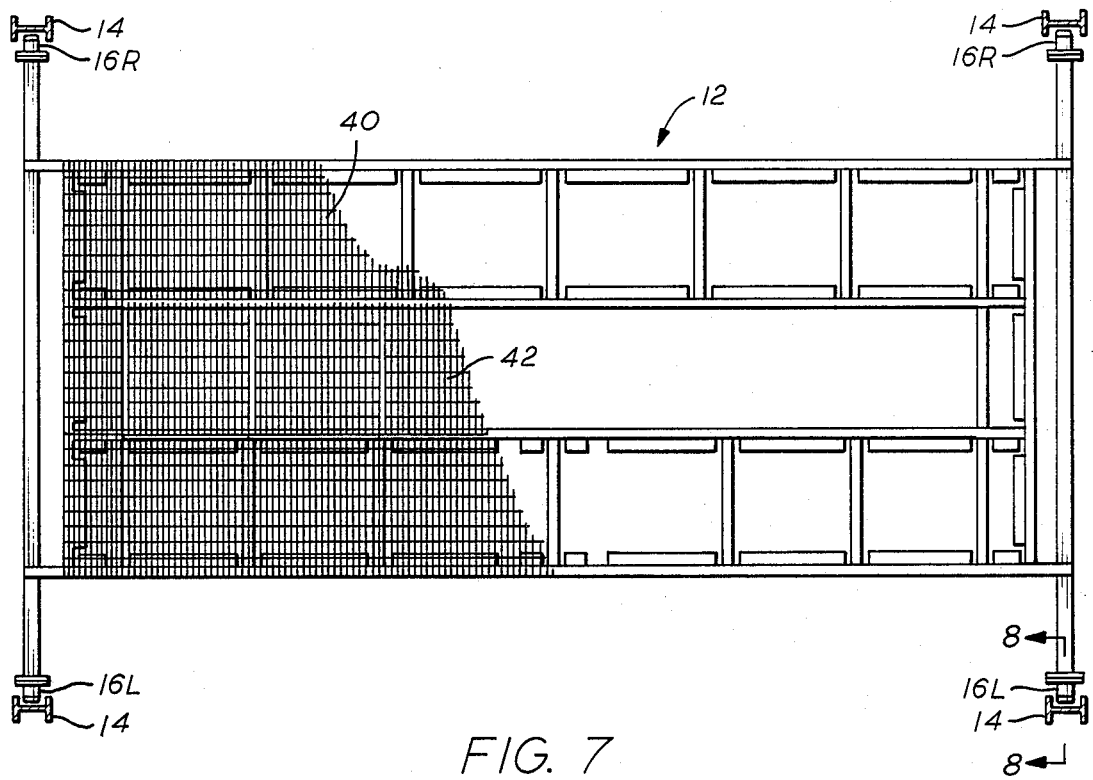
FIG. 7
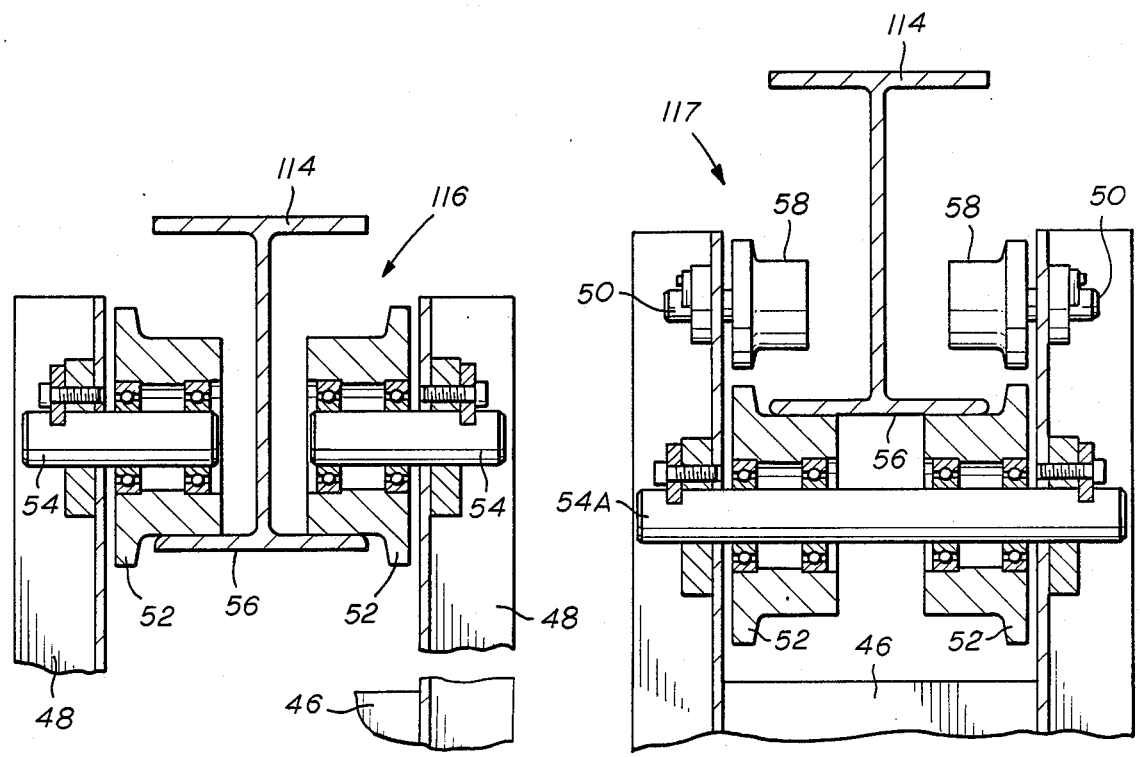
FIG. 11
FIG. 12

LOADING AND INSPECTION PLATFORM

FIELD OF THE INVENTION

This invention generally relates to worker access structures and more specifically relates to vertically moveable platforms from which workers can inspect the tops of mobil truck tanks, mobil railway car tanks, railway hopper cars, etc., and to make the necessary attachments and connections to fill these kinds of vessels with flowable materials.

BACKGROUND OF THE INVENTION

Slow processing of truck and rail car tanks due to inadequate methods can be very costly. Down time, created by repairs and break downs, is also costly in overall operation. The platforms of the present invention have been tested and proven to be efficient, safer, and virtually maintenance free.

Essentially the present invention is provided in two embodiments. One such embodiment utilizes four support columns which support a rectangular platform which can be raised and lowered as desired to be adjusted in height to permit a worker to have close and convenient working access to the tops of a tank truck, railway tank car, or the like. This embodiment can be expanded from four support columns supporting a single platform into six support columns jointly supporting two moveable platforms, and more, if desired, to accommodate one to several mobil tank units simultaneously.

Another embodiment is a work platform which is cantilevered from two support columns in order to conserve space for use in close quarters where conditions may restrict additional support columns.

All the working platforms are supplied with decks, safety hand rails, and removable grates which can be selectively opened to give access by a worker to a particular filling hatch, cover or dome.

As a standard feature, each platform structure is provided with upper and lower electrical limit switches that govern travel in both directions. The traveling portion of the platform is equipped with removable grafting that hinges back to expose the truck domes. These hinged grates are normally about three feet square for ease of handling and are made of fiberglass for minimum deflection and weight reduction. Hinges and hardware are stainless steel. Fixed grating or decking is installed on each side of the hinged grating.

Electrical control stations are provided to raise and lower the platforms from a ground level (and/or from the moveable platform if desirable).

Both models can be supplied in widths from about 6 to 12 feet and lengths up to 40 feet. Overall height is dependent upon platform travel that ranges from 4 feet to 14 feet, for example. Travel speeds may be from 9 to 13 feet per minute, for example.

As mentioned, all the platforms are equipped with standard safety hand rails in order to conform to various safety regulations. The platforms may also be provided with roof structures to protect the worker, the platform and the vessel under the platform from rain, snow, and the like.

Presently known prior art are U.S. Pat. Nos. 610,934; 2,582,625; 2,985,428; 4,013,140; 3,576,233; and 4,572,328.

OBJECTS OF THE INVENTION

The principle object of the present invention is to provide an inspection and loading platform which is efficient, safe, and virtually maintenance free.

Another object of the present invention is to provide a moving platform which maybe handily operated and used by a single worker.

SUMMARY OF THE INVENTION

The foregoing and other objects and advantages of the invention are attained in an access structure which includes a vertically moveable work platform having guide elements restrained with a plurality of vertical support members to vertically guide the platform along the support members. A plurality of lifting elements are connected respectively to each support member and to the platform to vertically move the platform along each support member. A common actuatable power unit is connected to each of the lifting elements to cause the lifting elements to vertically move the platform a prescribed distance along each support member responsive to actuation of the power unit. The power unit may include a mechanical rotatable drive mechanism connected to each of the lifting elements to be rotated responsive to each actuation of the power unit to vertically move the platform. The platform may be suspended from the cable of a hoisting drum and cable arrangement included in each of the lifting elements to be vertically moveable responsive to rotation of the hoisting drum. Alternately the lifting elements may include hydraulic cylinder units with the common actuatable power unit being an electrically driven pump. In some embodiments the guide elements may include slidable shoes adapted to slide along the web and between the flanges of H-beam support members. Alternately, in other embodiments, the guide elements may include rollers adapted to roll along the flanges of H-beam support members. The access structure may include four support members with a rectangular platform guided at each corner. Alternately, the access platform may include two support members with the moveable platform connected in cantilevered relation out from the sides of the support members.

BRIEF DESCRIPTION OF THE DRAWING

FIG. 4 is an elevational partly sectional view of the power unit as taken along the line 4—4 of FIG. 3;

FIG. 5 is an elevational partly sectional view of a lifting hoisting drum and cable assembly as taken at the lines 5—5 of FIG. 3;

FIG. 7 is a plan view of the rectangular loading platform as shown from the plane 7-7-7 of FIG. 1;

FIG. 8 is an elevational partly sectional view of one corner of the loading platform of FIG. 1 as taken along the line 8—8 of FIG. 7 and showing a guide element having a plastic skid nose positioned within the flanges of an H-beam support member;

FIG. 11 is a plan partly sectional view of an upper roller guide as taken along the line 11—11 of FIG. 9;

FIG. 12 is a plan partly sectional view of a lower roller guide as taken along the line 12—12 of FIG. 9; and FIG. 13 is a perspective semi-schematic view of an access structure alternate to those shown in FIGS. 1 and 2 and utilizing hydraulic lifting elements.

DESCRIPTION OF THREE PREFERRED EMBODIMENTS

Figure 1:
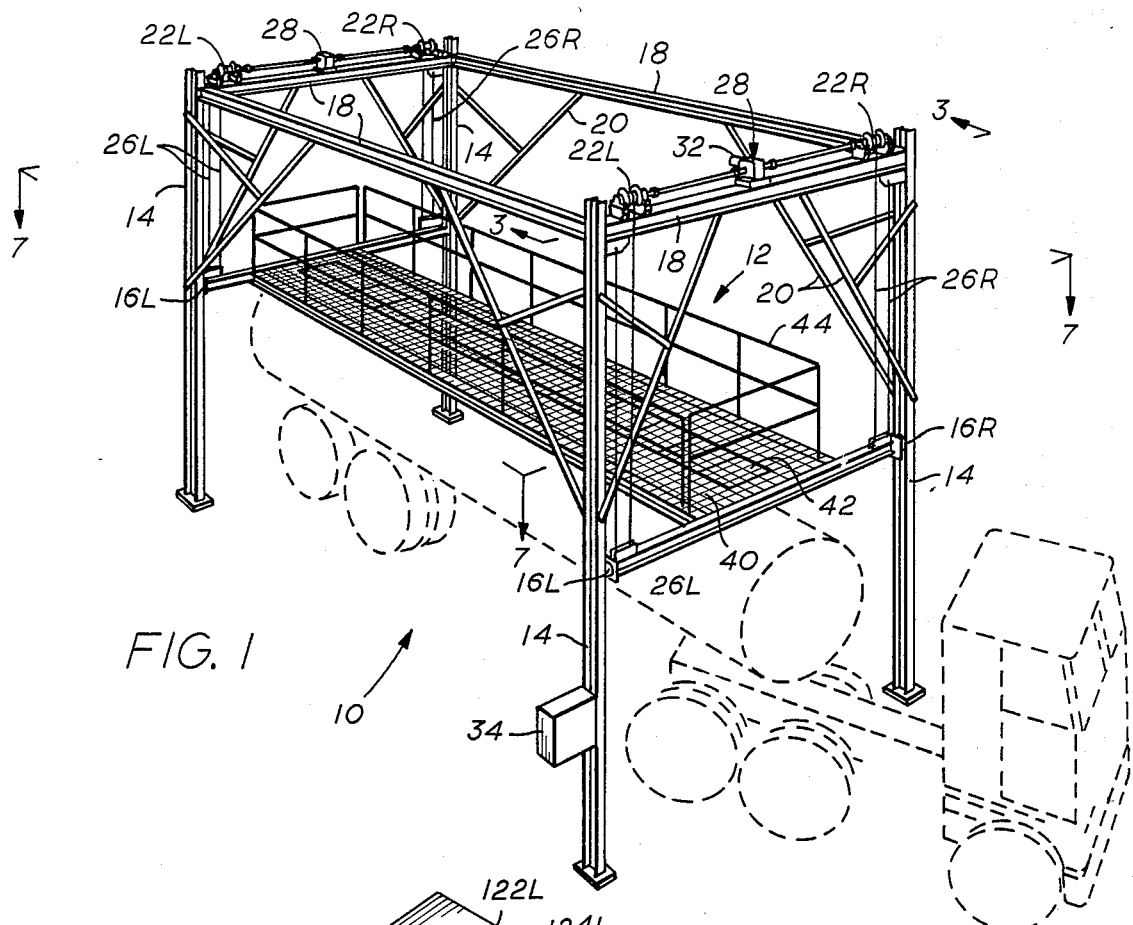
FIG. 1 is a perspective semi-schematic view of an embodiment of the access structure which utilizes four support members respectively disposed at the corners of a rectangular vertically moveable work platform.

FIG. 1 illustrates a loading and inspection platform 10 having a moveable platform 12 supported by four vertical support members 14. The platform 12 is restrained to move along the support members 14 by guide members 16R and 16L. The tops of the support members 14 are connected together with struts 18 and braced by lateral braces 20 as shown. Disposed at the front and rear of the platform 10 and connected to the struts 18 are lifting assemblies 22R and 22L including a hoisting drum and cable with each cable connected to a corner of the platform 12 such that rotation of each winch drum will respectively take up or pay out cable 26R or 26L to raise and lower each corner of the platform 12. The front and rear winch drums 24R and 24L are connected into an actuatable mechanical rotatable drive unit 28. The drive unit 28 may be a conventional ring gear and pinion arrangement or alternately a screw gear arrangement 30 and driven by an electrical motor 32 which may be controlled through various rotary limit switches (not shown) from an electrical control station 34. The platform 10 will be further described with reference to FIGS. 3, 4, 5, 6, 7, and 8.

Figure 2:
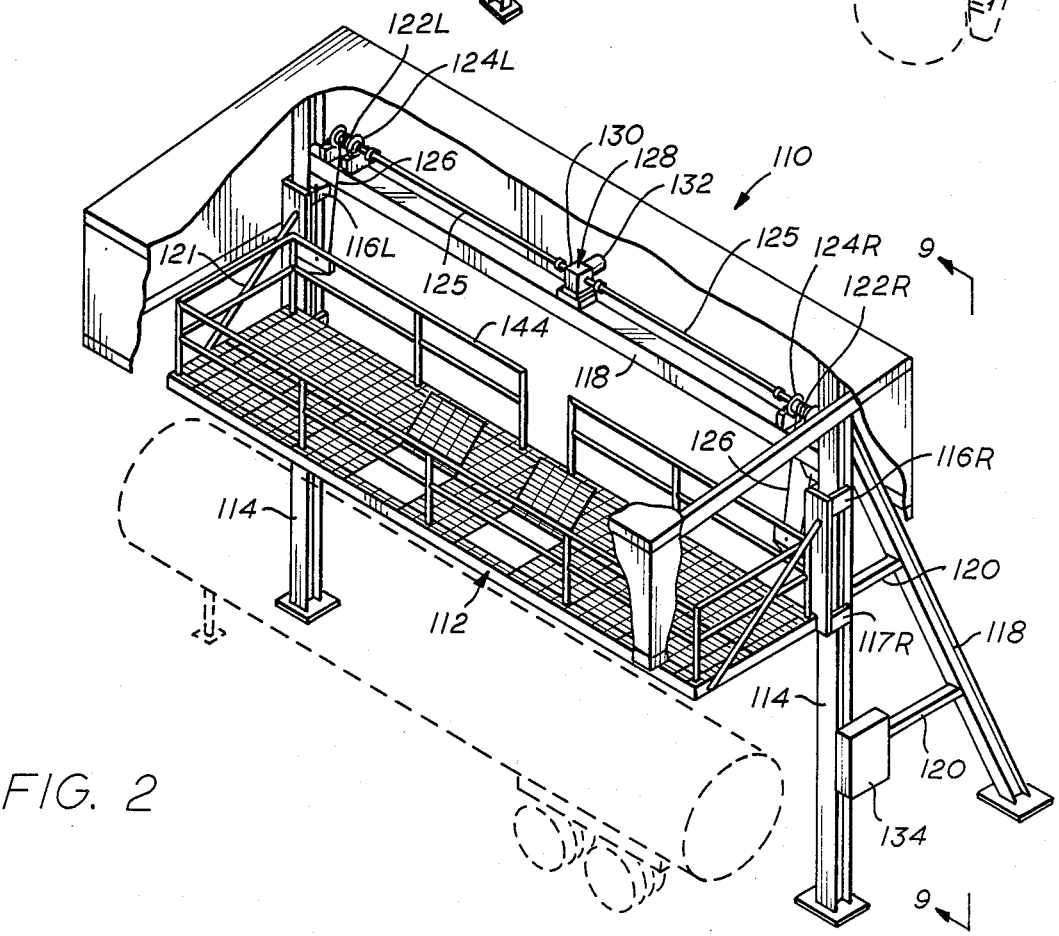
FIG. 2 is a perspective semi-schematic view of another embodiment of the access platform wherein two support members are utilized and the platform is cantilevered outwardly from the two support members as shown.

FIG. 2 illustrates another embodiment of an inspection and loading platform 110 which includes a moveable platform 112 which is in cantilevered support from two vertical support members 114. The platform 112 is restrained to move vertically along the support members 114 by connection of upper guide members 116R and 116L and lower guide members 117R and 117L. The two support members 114 are laterally supported by struts 118 which extend from near the top of the support members 114 to the ground some distance away. The strut members 118 are braced by connection of braces 120. Lifting assemblies 122R and 122L, each including a winch drum 124 and a cable 126, are connected such that the cable 126 is connected at each end of the platform 112. Rotation of each winch drum 124 will cause the cable 126 to be taken in or paid out and raise and lower each end of the platform 112 accordingly. An actuatable power unit 128 is commonly connected to each lift assembly 122 by means of drive shafts 125 such that rotation by the drive unit 128 rotates both the winch drums 124. The power unit 128 includes a mechanical rotatable drive unit 130 and an electrical drive motor 132 which is controlled through rotary limit switches from an electrical control station 134. Further description of this embodiment of FIG. 2 will be made with reference to FIGS. 9, 10, 11, and 12 as taken with the description of FIGS. 3, 4, 5, and 6.

Figure 13:
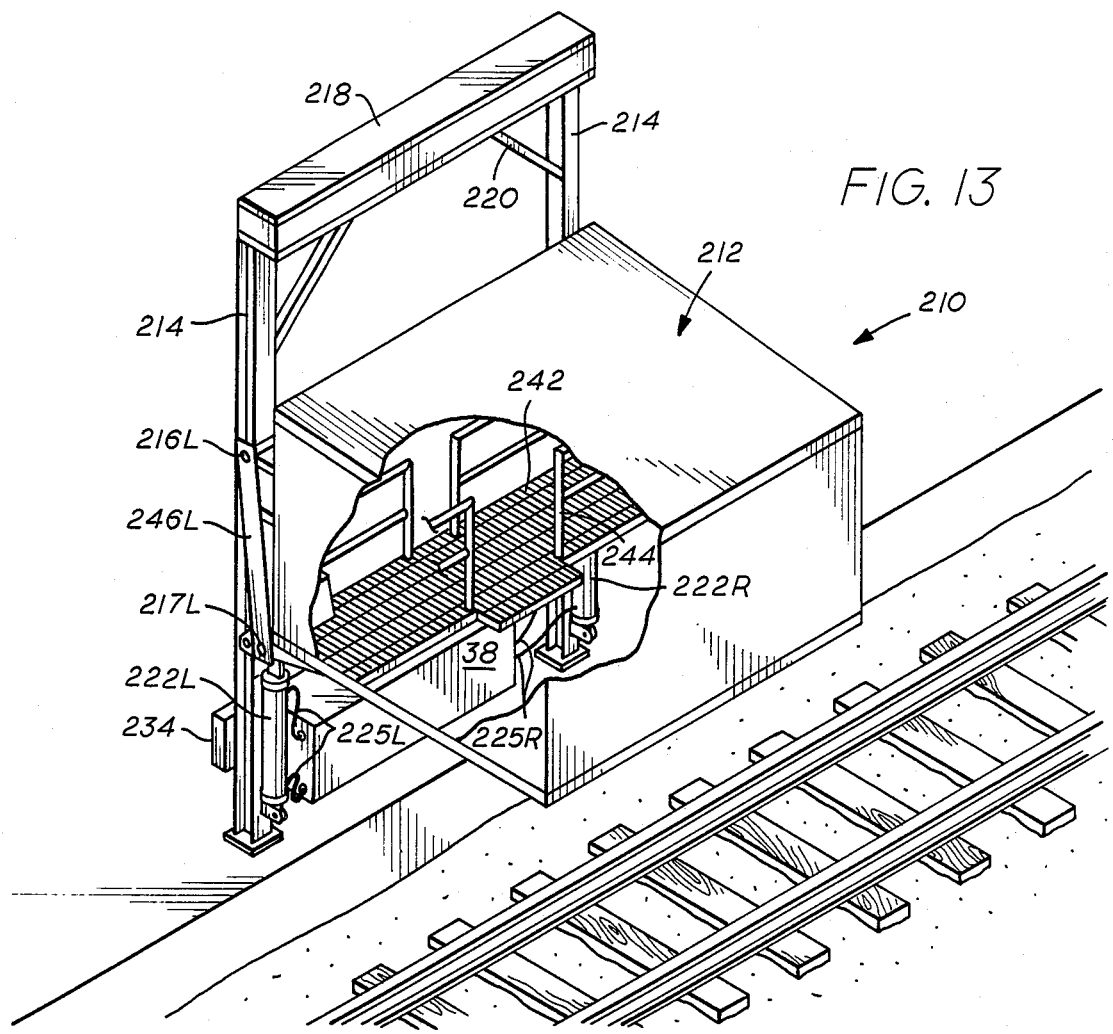
FIG. 13 is an elevational view taken at 3—3 of FIG. 1 and showing a central power unit connected to drive two drum and cable lifting assemblies which is one of a pair of such assemblies used at each end of the unit of the access structure.

FIG. 13 illustrates an inspection and loading platform 210 having a moveable platform 212 which is restrained to move vertically along two vertical support members 214 with connection of upper right guide members 216R and 216L along with lower guide members 217R and 217L. The structure of platform 210 is similar to that of platform 110 with the principle exception being that the platform is raised and lowered by hydraulic cylinders 222R and 222L connected between the platform 212 and the support members 214 as shown. The hydraulic cylinders 222R and 222L are actuated by hydraulic connection to an actuatable hydraulic drive unit 38. The hydraulic drive unit 38 includes an electrical motor and a hydraulic pump (not shown) and is actuated through appropriate limit switches (not shown) from an electrical control station 234.

It is to be noted that the electrical control stations 34, 134, and 234 may be located at ground level, as shown, and also may be located with the platform to be operated by a worker on the platform. If desired, dual electrical control stations may be provided with one being located at ground level and the other being located at the platform. The wiring and installation of these control stations and limit switches, as described, are well within the capability of the usual journeyman maintenance or construction electrician.

All the vertical support members 14, 114, and 214 are herein illustrated as being H-beam members. However, other rolled structural shapes such as I-beams, U-channels, L's (or similar prefabricated members) may be used as desired depending on comparative costs and availability.

Figure 6:
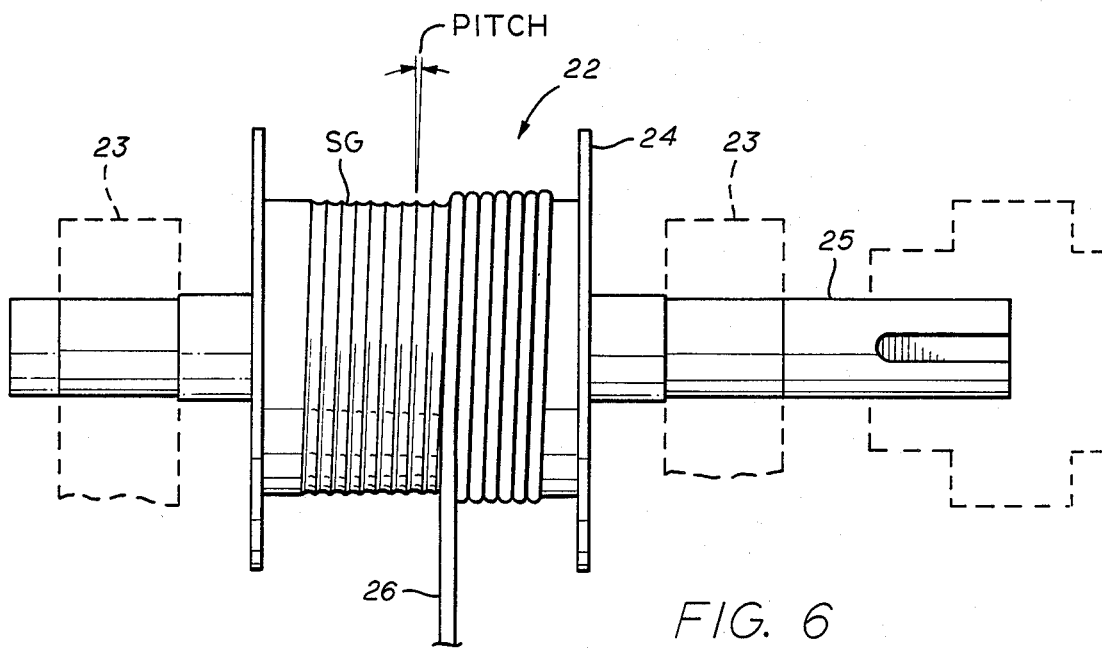
FIG. 6 is a detailed view of the hoisting drum shown in FIGS. 3 and 5.

Referring now to FIGS. 3, 4, 5, 6, 7, and 8, the features of the platform 10 of FIG. 1 are shown in more detail. In FIG. 3 the actuatable drive unit 28 is shown to be connected to the lift assemblies 22R and 22L respectively through rotary drive shafts 25R and 25L. The lifting unit 22L is shown to have a hoisting drum 24L which pays out or takes up a cable 26 which extends down through a traveling block 27 which is connected to the platform 12 and back up for stationary attachment to a bracket 29 connected to the mount of the lift unit 22. FIG. 6 shows the hoisting winch drum 24 in more detail as having a spiral groove SG formed in a drum at a pitch angle appropriate for a particular size of cable such that the cable 26 is guided onto and off of the drum automatically. The drum 24 is seen to be mounted in bearing blocks 23.

FIG. 4 is an elevational view of the actuatable power unit 28 as taken along the line 4—4 of FIG. 3 and shows the unit 28 to have a gear box 30 having output shafts respectively connected to the drive shafts 25R and 25L. The gear box may comprise a screw gear assembly, or a gear and pinion assembly, depending upon the gear ratios desired. The gear box unit 30 is driven by an electrical motor 32 which may also include a reduction gear assembly (not shown) as desired. The net result of the gear ratios as described, along with the diameter of the winch drums 24, is to provide appropriate pay out or take up velocity of the cable 26 of from 4 to 14 feet per minute, for example. Such a motor 32 may be equipped with an automatic brake (not shown) which stops the entire assembly instantaneously when the motor is stopped. Electrical wiring (not shown) is connected through appropriate position limit switches (not shown) to the electrical control station 34 as previously mentioned.

FIG. 5 illustrates a typical lifting unit assembly 22 having a winch drum 24 and cable 26. The drum is connected to a rotary drive shaft 25 as schematically shown.

FIG. 7 illustrates the platform 12 as restrained within the support members 14 by guide members 16R and 16L. A typical guide member 16 is shown in FIG. 8. As shown, each corner of the platform 12 is equipped with a tubular guide member 12G into which is fitted a plastic skid nose 12S. The skid nose 12S may be suitably provided of a plastic such as PVC, polyurethane, polypropylene, or the like.

FIG. 7 shows the platform 12 to be provided on either side with decks or grates 40 which may be advantageously provided of ventilated or see-through fiberglass, steel decking, or expanded metal grating as desired. Down along the center of the platform 12 are mounted hinged grates 42 which may be opened up and back as desired to expose one or more domes of a tank truck parked underneath the platform, for example As shown, the decks and grates 40 and 42 have openings to permit an operator to see what is below. As previously mentioned, these grades may be made of fiberglass or stainless steel, for example, for minimum deflection and weight reduction.

It should be noted that platforms of the type disclosed in this specification may be installed in extremely corrosive environments. For this reason the hardware is usually provided of stainless steel, fiberglass, or other non-corrosive or corrosive resistant material. The steel portions of the structure (not shown) are treated as necessary with corrosion resistant paints.

As shown in FIG. 1, the platform 12 is equipped with a protective safety railing 44 around all sides with only one opening extending to a stair assembly (not shown) to permit access entry and exit by a worker.

When and as desired, the entire structure of platform 10 may be covered over with a fiberglass roof structure which covers the one unit as shown in FIG. 1 or which will cover multiples of the one unit as previously described.

As an alternate embodiment, FIG. 2 illustrates a platform 110 having a moveable platform 112 cantilevered off of two vertical support members 114 which also may be H-beams as previously described. The platform 112 is equipped with safety handrails 144 around and may be also equipped with a protective roof as desired.

Figure 9:
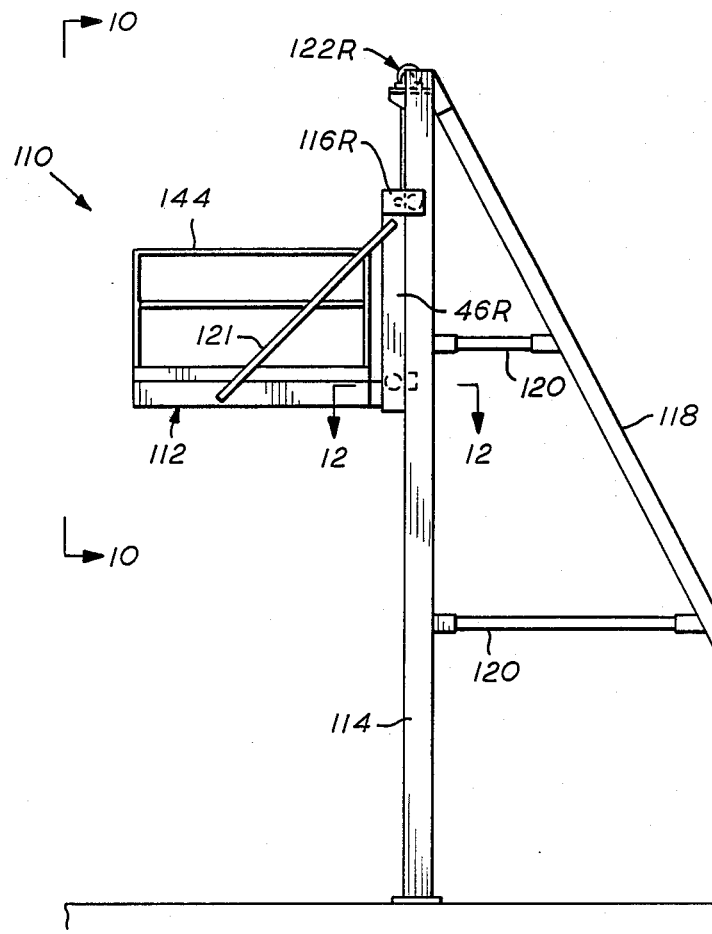
FIG. 9 is an end elevational view of the access structure embodiment shown in FIG. 2 and taken along the line 9—9 of FIG. 2.

As shown in FIG. 9, the platform 112 is connected in cantilevered fashion from the vertical supports 114 through connection to support posts 46R and 46L which are attached to an upper guide members 116R and 116L and lower guide members 117R and 117L. The upper guide 116 is best shown in FIG. 11. The upper roller guide 116 includes two frames 48 connected to the support post 46. The frames 48 carry two support rollers 52 mounted on support shafts 54. The support rollers 52 bear against the inside of a flange 56 of the H-beam 114.

FIG. 12 illustrates the lower guide roller 117. As shown, the lower guide 117 is made up of components which are the same as for the upper roller guide 116 with exception of the shaft 54A and keeper rollers 58 mounted on shafts 50. In the lower roller guide 117, the support rollers 52 bear against the exterior of the flange 56 and the keeper rollers 58 are disposed adjacent the inner side of flange 56 of H-beam 114. As seen in FIG. 9, the cantilevered weight of the moveable platform 112 causes a force couple which bring the support rollers 52 of the upper guide 116 and the lower guide 117 into load bearing relation against the flange 56 of H-beam 114 as shown.

Also noted, is that braces 121 are utilized to support the platform 112 with the post 46.

Figure 10:
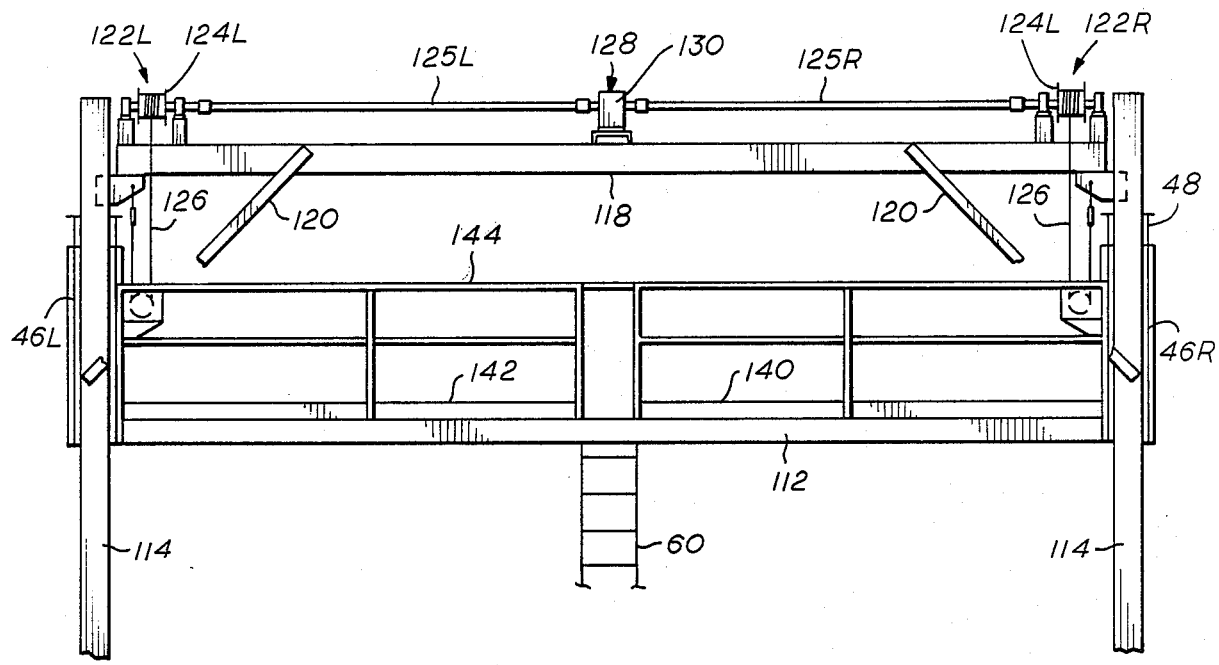
FIG. 10 is an elevational view of the embodiment of the access structure shown in FIG. 2 as taken along the line 10—10 of FIG. 9.

As shown partly in FIG. 10, a ladder or stairway 60 having hand rails (not shown) is pivotally connected to the platform 112 and provided at ground level with rollers (not shown) such that raising and lowering of the platform 112 will cause the rollers to move back and forth along the ground to accommodate the ladder 60 to the change in height of the platform 112. Though not shown, a similar arrangement is provided as needed for the platform 10 of FIG. 1 and the platform 210 of FIG. 13, later described.

FIGS. 2, 9, and 10 show the lifting elements and drive elements previously described with reference to FIGS. 1 and 3–8 and bear similar numbers with the prefix "1."

The structure of FIG. 13 is similar to the cantilevered structure of FIGS. 2, 9, and 10 excepting that the lifting elements are hydraulic cylinders 222R and 222L connected between the platform 212 and the H-beam support members 214. The common actuatable power means is an electrically driven hydraulic pump arrangement 38 hydraulically connected to the lifting cylinders 222R and 222L via hydraulic conduits 225R and 225L. In this embodiment, the electrical motor (not shown) is connected through appropriate limit switches to a control station 234.

All three of the embodiments as herein illustrated and described are operated in the same manner. The worker manipulates the control station 34, 134, or 234 as appropriate to assure that the platform is raised enough to clear any tank or vessel that may be moved underneath. The platform is then lowered to place the worker in convenient working relationship with the top domes or fill ports of the vessel and the grates are withdrawn or opened and the vessel inspected and connected as desired for filling or emptying.

It will become apparent to those skilled in the art that the embodiments as herein disclosed may be revised or modified with such modifications or revisions coming within the scope and purview of the appended claims.

What is claimed is:

1. An access structure comprising:
   (a) a vertically movable work platform having guide means restrained with a plurality of vertical support members to vertically guide said platform along said support members;
   (b) a plurality of lifting means respectively and independently connected to each said support member of said support means and to said platform to vertically move said platform along each said support member; and
   (c) a common actuatable power means respectively connected to each of said lifting means to cause said lifting means to vertically move said platform a prescribed distance along each said support member responsive to each actuation of said power means;
   (d) said platform including a see-through floor having at least one access grate member which can be opened to give access from above said floor to equipment located below said floor;

(e) said platform having enclosure means including safety rails around the edges of said platform; and (f) said structure permitting an operator to inspect and fill vessels as rolled into position under said platform.

2. The access structure of claim 1 wherein said actuatable power means includes a common mechanical rotatable drive means respectively connected to each said lifting means to be rotated responsive to each actuation of said power means to thereby vertically move said platform.

3. The access structure of claim 1 wherein said platform is suspended from the cable of a hoisting drum and cable means included in each said lifting means to be vertically moveable responsive to rotation of the hoisting drum of said hoisting drum and cable means.

4. The access structure of claim 1 wherein: (a) said actuatable power means includes a common mechanical rotatable drive means connected to each of said lifting means to be rotated responsive to each actuation of said power means; and (b) said platform is suspended from the cable of a hoisting drum and cable means included in each said lifting means to be vertically moveable responsive to rotation of the hoisting drum of said hoisting drum and said cable means.

5. The access structure of claim 1 wherein said enclosure means further includes a roof structure.

6. The access structure of claim 1 wherein said guide means are roller means.

7. The access structure of claim 1 wherein said guide means are slidable plastic shoe means.

8. The access structure of claim 1 wherein said actuatable power means is electrically driven.

9. The access structure of claim 7 wherein said vertical support members comprise four H-beams disposed at four corners of said platform and receiving said shoe means against the web and between the flanges of said H-beams.

10. The access structure of claim 6 wherein: (a) said support members comprise two H-beams; (b) said platform is cantilevered from each said support member; and (c) said guide means comprise upper guide roller means and lower guide roller means.

11. The access structure of claim 10 wherein: (a) said lifting means comprise hydraulic cylinder means; and (b) said actuatable power means comprises electrically driven pump means.

12. The access structure of claim 10 further including lateral support means connected to provide horizontal support to said vertical support member near the top of each said vertical support member.

13. an access structure including a vertically movable work platform, said structure comprising:

(a) a vertically moving work platform having slidable guide shoe means restrained within the flanges of four H-beam support member disposed at four corners of said platform to vertically guide said platform along said support members;

(b) a plurality of lifting means each comprising a hoisting drum and cable means respectively connected to each support member of said support means and to said platform to vertically move said platform responsive to rotation of the hoisting drum of said hoisting drum and cable means;

(c) actuatable power means comprising a mechanical rotatable drive means connected to each of said lifting means to be rotated responsive to each actuation of said power means to cause said lifting means to vertically move said platform a prescribed distance along each said support means responsive to each actuation of said power means;

(d) said platform including a see-through floor having at least one access grate member which can be opened to give access from above said floor to objects located below said floor;

(e) said platform having enclosure means including safety rails around the edges of said platform; and (f) said structure permitting an operator to inspect and fill vessels as moved into position under said platform.

14. an access structure comprising:

(a) a vertically moving work platform having guide means restrained with a plurality of vertical support members to vertically guide said platform along said support members;

(b) a plurality of lifting means comprising hydraulic cylinder means respectively connected to each said support member of said support means and to said platform to vertically move said platform along each of said support means; and (c) actuatable power means comprising electrically driven hydraulic pump means connected to each of said lifting means to cause said lifting means to vertically move said platform a prescribed distance along said support means responsive to each actuation of said power means;

(d) said platform including a see-through floor having at least one access grate member which can be opened to give access from above said floor to below said floor;

(e) said platform having enclosure means including safety rails around the edges of said platform; and (f) said structure permitting an operator to inspect and fill vessels as moved into position under said platform.

15. The access structure of claim 14 wherein said guide means are roller means.

16. The access structure of claim 15 wherein (a) said support members comprise two H-beams; (b) said platform is cantilevered from each said support member; (c) said guide means comprise upper guide roller means and lower guide roller means engaged with each of said H-beams.

* * * * *